United States Patent
Duplys et al.

(10) Patent No.: US 12,169,560 B2
(45) Date of Patent: Dec. 17, 2024

(54) RESOURCE-EFFICIENT VERIFICATION OF MESSAGES IN A SERVICE-ORIENTED COMMUNICATION SYSTEM

(71) Applicant: Robert Bosch GmbH, Stuttgart (DE)

(72) Inventors: Paulius Duplys, Markgroeningen (DE); Tobias Gehrmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 204 days.

(21) Appl. No.: 17/939,262

(22) Filed: Sep. 7, 2022

(65) Prior Publication Data

US 2023/0070247 A1   Mar. 9, 2023

(30) Foreign Application Priority Data

Sep. 9, 2021   (DE) ...................... 10 2021 209 973.4

(51) Int. Cl.
  *G06F 21/00*   (2013.01)
  *G06F 21/55*   (2013.01)
(52) U.S. Cl.
  CPC ...... *G06F 21/554* (2013.01); *G06F 2221/034* (2013.01)
(58) Field of Classification Search
  CPC .. G06F 21/554; G06F 2221/034; G06F 21/85; G06F 21/606
  See application file for complete search history.

(56) References Cited

U.S. PATENT DOCUMENTS

| | | | |
|---|---|---|---|
| 2017/0302441 A1* | 10/2017 | Temple | G06F 21/64 |
| 2021/0103655 A1* | 4/2021 | Hung | G06F 21/51 |
| 2022/0166632 A1* | 5/2022 | Lee | H04L 9/0866 |
| 2023/0024751 A1* | 1/2023 | Shyamalan | H04L 63/0838 |
| 2024/0106916 A1* | 3/2024 | Choi | H04L 9/40 |

FOREIGN PATENT DOCUMENTS

| | | | | |
|---|---|---|---|---|
| EP | 4092552 A1 * | 11/2022 | | G06F 21/554 |
| JP | 2023013855 A * | 1/2023 | | |

* cited by examiner

*Primary Examiner* — Ka Shan Choy
(74) *Attorney, Agent, or Firm* — NORTON ROSE FULBRIGHT US LLP; Gerard A. Messina

(57) ABSTRACT

A computer-implemented method for verifying messages in a service-oriented communication system of a vehicle, including receiving a message and a signature in a first entity of the service-oriented communication system, the message and the signature being received via the service-oriented communication system; checking if the message corresponds to a dedicated message and the signature corresponds to a signature belonging to the dedicated message; and verifying the message, if the checking turns out positive. A computer-implemented method for generating predetermined messages in a first entity of a service-oriented communication system of a vehicle, and a service-oriented communication system in a vehicle, which is configured, are also described.

13 Claims, 4 Drawing Sheets

RESOURCE-EFFICIENT VERIFICATION OF MESSAGES IN A SERVICE-ORIENTED COMMUNICATION SYSTEM

CROSS REFERENCE

The present application claims the benefit under 35 U.S.C. § 119 of German Patent Application No. DE 10 2021 209 973.4 filed on Sep. 9, 2021, which is expressly incorporated herein by reference in its entirety.

BACKGROUND INFORMATION

Service-oriented communication systems are being used increasingly in vehicles. In contrast to, for example, signal-based communication systems, such as CAN bus systems, which are determined essentially statically in a development phase, service-oriented communication systems are designed to be adapted and/or expanded dynamically during operation of the vehicle. In this context, the interaction between entities of the service-oriented communication system, such as electronic control units of the vehicle (that is, ECU's), may be reproduced dynamically by services and, in particular, during the operation of the vehicle. For example, an entity in the service-oriented communication system may publish a service and therefore provide it to other entities of the service-oriented communication system. For example, an entity in the service-oriented communication system may also call up (subscribe to) a service of another entity of the service-oriented communication system. By publishing and/ or calling up services, external control units and/or electronic devices, which do not belong to the hardware of the vehicle, may also be integrated into the service-oriented communication system at least temporarily. Such an electronic device may also be, in particular, a smartphone of a user of the vehicle, who would like to have, for example, music from his/her smartphone played through the multimedia device of the vehicle.

SOME/IP (scalable service-oriented middleware over IP) is a standard for IP-based, service-oriented communication in vehicles. This middleware (also, intermediate application or service layer) is situated in layers 5 through 7 of the standard ISO/OSI communication layer model and uses either TCP or UDP as underlying transport protocols. SOME/IP allows applications in entities of the service-oriented communication system to communicate with each other without knowledge of the specific entity, in which the specific application is running. SOME/IP has been an integral part of AUTOSAR since AUTOSAR Version 4.0.

In addition to the functionalities, publishing and/or calling-up of services already described, SOME/IP includes, for example, a functionality for detecting services (service discovery, SOME/IP-SD), which allows entities in the service-oriented communication system to find services dynamically (that is, during the running time), in the service-oriented communication system, and to obtain their corresponding IP addresses and port numbers, by which the services may be called up. Furthermore, SOME/IP offers a functionality for remote procedure calls (RPC's). In one remote procedure call, an entity of the service-oriented communication system may call up a function in another entity (that is, a remote function/procedure) in such a manner, that the function is executed in the other entity and any return values of the function are transmitted over the service-oriented communication system to the requesting entity of the service-oriented communication system. The communication in SOME/IP may be controlled by a SOME/IP routing manager.

The increasing complexity and interconnectivity of modern vehicles produces a larger and larger surface of attack for possible intrusion into the electronics of the vehicle and therefore, in particular, into the service-oriented communication system. Current or known versions of SOME/IP do not include any safety mechanisms for protecting against intrusion.

In a service-oriented communication system, such as SOME/IP, in particular, messages may be sent by one entity of the service-oriented communication system to another entity of the service-oriented communication system. An intrusion into the service-oriented communication system may be carried out, for example, by manipulating the content and/or the sender of a message sent over the service-oriented communication system. Then, for example, an effect intended by the intruder (e.g., damage) may be produced by such manipulation.

SUMMARY

A first general aspect of the present invention relates to a computer-implemented method for verifying messages in a service-oriented communication system of a vehicle. According to an example embodiment of the present invention, the method includes receiving a message and a signature in a first entity of the service-oriented communication system; the message and the signature being received via the service-oriented communication system. The method further includes checking if the message corresponds to a dedicated message and the signature corresponds to a signature belonging to the dedicated message. The method further includes verifying the message, if the checking turns out to be positive.

A second general aspect of the present description relates to a computer-implemented method for generating dedicated messages and, optionally, corresponding signatures, in a first entity of a service-oriented communication system of a vehicle, in order to verifiably communicate with a second entity of the service-oriented communication system. According to an example embodiment of the present invention, the method includes sharing a secret key with the second entity. The method further includes sharing a plurality of messages dedicated to the communication between the first entity and the second entity with the second entity, in a predetermined order. The method further includes generating one signature per dedicated message of the plurality of messages dedicated to the communication between the first entity and the second entity, and in the predetermined order, on the basis of at least the secret key, in such a manner, that for each dedicated message, the signatures in the first entity and the second entity match. The method further includes storing the messages dedicated to the communication between the first entity and the second entity and, optionally, the corresponding signatures, in the first entity.

According to the method for generating dedicated messages and, optionally, corresponding signatures in the first entity of the service-oriented communication system of the vehicle, in the method for verifying messages in a service-oriented communication system of a vehicle according to the first general aspect (or a specific embodiment of it), the dedicated message and, optionally, the signature corresponding to the dedicated message, may have been stored in the first entity, in order to verifiably communicate with a second entity of the service-oriented communication system according to the second aspect (or a specific embodiment of it).

A third general aspect of the present invention relates to an entity in a service-oriented communication system in a vehicle. According to an example embodiment of the present invention, the entity is configured, as a first entity, to execute the computer-implemented method for verifying the messages in the service-oriented communication system of the vehicle according to the first general aspect (or a specific embodiment of it) and/or configured (as a first entity) to execute the computer-implemented method for generating the dedicated messages and, optionally, the corresponding signatures, in the first entity of the service-oriented communication system of the vehicle, in order to communicate verifiably with a second entity of the service-oriented communication system according to the second general aspect (or a specific embodiment of it).

A fourth general aspect of the present invention relates to two entities in a service-oriented communication system. According to an example embodiment of the present invention, one entity of the two entities according to the third general aspect (or a specific embodiment of it) and another entity of the two entities according to the third general aspect (or a specific embodiment of it) being configured with the provision that the first entity and the second entity are interchanged.

A fifth general aspect of the present invention relates to a service-oriented communication system in a vehicle, including an entity according to the third general aspect (or a specific embodiment of it) and/or two entities according to the fourth general aspect (or a specific embodiment of it).

A sixth general aspect of the present invention relates to a computer program, which is configured to execute the computer-implemented method for verifying messages in the service-oriented communication system of the vehicle according to the first general aspect (or a specific embodiment of it) and/or to execute the computer-implemented method for generating dedicated messages and, optionally, corresponding signatures, in the first entity of the service-oriented communication system of the vehicle, in order to communicate verifiably with a second entity of the service-oriented communication system according to the second general aspect (or a specific embodiment of it).

A seventh general aspect of the present invention relates to a computer-readable medium or signal, which the computer program according to the sixth general aspect stores and/or contains.

An eighth general aspect of the present invention relates to a computer system, which is configured to execute the computer program according to the sixth general aspect.

The methods of the present invention provided in this description are directed towards the verification of messages in a service-oriented communication system of a vehicle. The verification of a received message may include a proof of the authenticity of the message. In this case, it may be ruled out that the sender of the received message has been changed (e.g., willfully manipulated). Alternatively, or in addition, the verification of the received message may include a proof of the integrity of the message. In this case, it may be ruled out that the contents of the received message have been changed (e.g., willfully manipulated). By verifying the received message, the message may be prevented from being changed (e.g., willfully manipulated) with regard to its sender and/or its content. If a received message is unable to be verified, then it may be ignored, for example. In this manner, an effect intended via manipulation of the message, such as damage to the service-oriented communication system and/or to the vehicle, may be prevented. Due to this, the security of the service-oriented communication system, of the vehicle, and/or of a user of the vehicle may be increased.

Current or known versions of SOME/IP do not have any security mechanisms for protecting against intrusion and/or manipulation. The methods provided in this description may be used as protection from intrusion and/or manipulation in SOME/IP.

Authenticity and/or integrity of messages may be proven by signatures (also tokens, hashes), which may be computed, for example, using a message authentication code (MAC). Depending on the security requirement, the signatures and/or their generation must meet high or the highest cryptographic standards. For example, only legitimate parties, which have knowledge of at least one common secret (e.g., a secret key), should be able to generate the signatures. In addition, the signatures may be a function of the specific, corresponding messages, for example. Furthermore, for communication on the basis of a plurality of messages, precautions may (and should) be taken, which do not allow multiple use (a replay attack) of one and the same signature for different messages. In this manner, a high/the highest degree of security may even be attained, if a signature of a third, illegitimate party has been tapped.

Cryptographic calculations are normally computationally intensive and also time-consuming. However, the computing power in computer systems and, in particular, in embedded systems, as are often used in control units (ECU's) of, e.g., a vehicle, may be limited and may not be sufficient for cryptographic computations, in particular, since such computer systems/embedded systems are also designed for as low a rate of power input as possible, in order to keep, for example, the power consumption of the vehicle as low as possible (apart from, e.g., the production costs), even in the case of an increasing number of control units and/or messages to be exchanged between these control units. Therefore, presently, it appears to be difficult, indeed, if not impossible, to compute the signatures of all of the messages to be exchanged between these control units, immediately prior to sending them, and to verify them via cryptographic computations immediately after receiving them.

The methods of the present invention provided in this description may solve this problem with the aid of messages dedicated to the communication between two entities of the service-oriented communication system, and, optionally, with the aid of predetermined signatures (that is, computed in advance) (at least partially, that is, for a portion of the messages in the service-oriented communication system). Consequently, the methods may be particularly advantageous for more effective protection of service-oriented communication systems having limited computing power (such as in the vehicle). In the case of the vehicle, the computation of signatures in advance may take place, for example, prior to the start of a trip, within the scope of (re)initialization, and/or during a (relatively long) stop of the vehicle. In the case of vehicles, which may be charged via a socket, it is also conceivable for the computation of the signatures in advance to take place during the charging, if the power may be provided by an external power source.

The restriction to a portion of the messages is initially based on the fact that in practice, not all messages may be agreed upon and exchanged between the two entities in advance. For example, a message may perfectly well include content, which is changeable in time and is supplied, for example, by a sensor value variable over time. In addition, computation of the signatures of all of the messages in advance (if possible, or of all possible configurations of messages) would be overly resource-intensive and time-consuming, as well, and consequently, not practical. On the other hand, in a service-oriented communication system, there may be a plurality of (standard) messages, which do not include content changeable over time and may therefore be protected, using the methods provided in this description. The communication in the service-oriented communication system may already be protected more effectively by protecting this portion of the messages.

DETAILED DESCRIPTION OF EXAMPLE EMBODIMENTS

Figure 1:
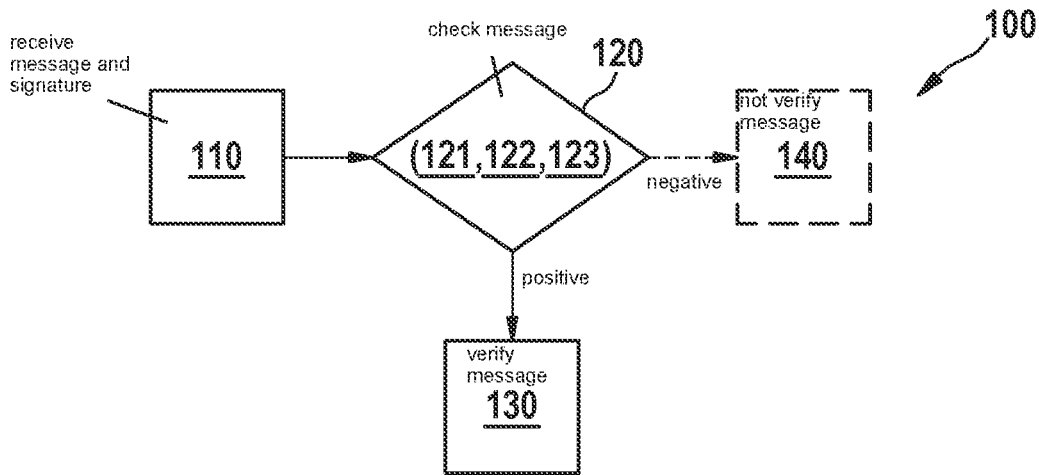
FIG. 1 schematically illustrates a computer-implemented method for verifying messages in a service-oriented communication system of a vehicle, according to an example embodiment of the present invention.

Using computer-implemented methods 100, 200, messages in a service-oriented communication system of a vehicle may be verified. This allows the level of security to be increased or the security to be ensured even in the case of an increasingly larger surface of attack in the vehicle. The specific embodiments of methods 100, 200 may also be generalized to one or more technical systems, which are not necessarily vehicles, but each include at least one service-oriented communication system (e.g., SOME/IP). For example, such a technical system may be a robot (e.g., without wheels).

Service-oriented communication system 300 may be communication middleware SOME/IP. Alternatively, service-oriented communication system 300 may include communication middleware SOME/IP.

A computer-implemented method 100 for verifying messages in a service-oriented communication system 300 of a vehicle is described. Verifying a message may include authenticating the message (as a function of a result of the checking 120). Alternatively, or in addition, verifying the message may include checking and (as a function of the result of the checking 120) confirming the integrity of the message.

Method 100 includes receiving 110 a message and a signature in a first entity 310 of service-oriented communication system 300; the message and the signature being received 110 via service-oriented communication system 300. An entity 310, 320 may be, for example, a nodal point in service-oriented communication system 300, which may be, in turn, a network (of nodal points). One entity 310, 320 may be, for example, a control unit ECU of the vehicle. Alternatively, or in addition, one entity may be a logical software unit or an interface.

Method 100 further includes checking 120 if the message corresponds to a dedicated message (within first entity 310) and the signature corresponds to a signature belonging to the dedicated message.

A message (e.g., the received 110 message and/or the dedicated message) may be a piece of data (e.g., a bit or byte sequence, a character string). The message may be configured to transmit a communication in the service-oriented communication system, to, e.g., an entity (e.g., first entity 310) of the service-oriented communication system. The checking 120 as to whether the message corresponds to a dedicated message (and the signature corresponds to a signature belonging to the dedicated message) may include fetching at least one dedicated message (and corresponding signature) from a storage device in first entity 310. The dedicated message may be predetermined, in that it is already dedicated before the message is sent and/or received 110. For example, the dedicated message may already be stored (in the storage device) in first entity 310, before the message is sent (e.g., by second entity 320) and/or received 110 by first entity 310. The dedicated message may be predetermined, for example, in that it is already stored 250 (in the storage device) in first entity 310 at least a minute or at least an hour prior to the sending and/or receiving of the message. In method 200, for example, the dedicated message may be stored 250 in first entity 310.

A signature (e.g., the received 110 signature and/or the signature associated with a dedicated message) may be a piece of data (e.g., a bit sequence or byte sequence, a character string), which is designed to ensure the authenticity of a message. Alternatively, or in addition, the signature may be designed to ensure the integrity of the message. The signature may be computed, using a cryptographic algorithm (e.g., MAC). Depending on the security requirement, the signature and/or its generation must meet high or the highest cryptographic standards. For example, only legitimate parties, which have knowledge of at least one common secret (e.g., a secret key s), should be able to generate the signature. A signature may be referred to as a token and/or hash.

Method 100 further includes verifying 130 the message, if the checking 120 turns out to be positive. After the message is verified 130, the dedicated message and the corresponding, dedicated signature may be erased, e.g., from the storage device in first entity 310. In this manner, the security may be increased in certain cases, if, for example, the signature is a function of only one secret key s, since multiple-use/replay attacks become more difficult or impossible in the case of a tapped signature.

Method 100 may include not verifying 140 the message, if the checking 120 turns out to be negative. In practice, not all messages, which are intended to be sent via the service-oriented communication system, may be exchanged in advance. Consequently, not all of the messages may be verified in accordance with method 100. Not verifying 140 means that the message may not be verified within the scope of the methods 100, 200 provided in this description. However, a further verification method not provided in this description may possibly be used. In the case of a non-verified 140 message, at least one measure (e.g., a warning, an abnormal termination/restart of the current routine, . . . )

may be initiated, in order to protect first entity 310, the service-oriented communication system, the vehicle, and/or its user.

Figure 3:
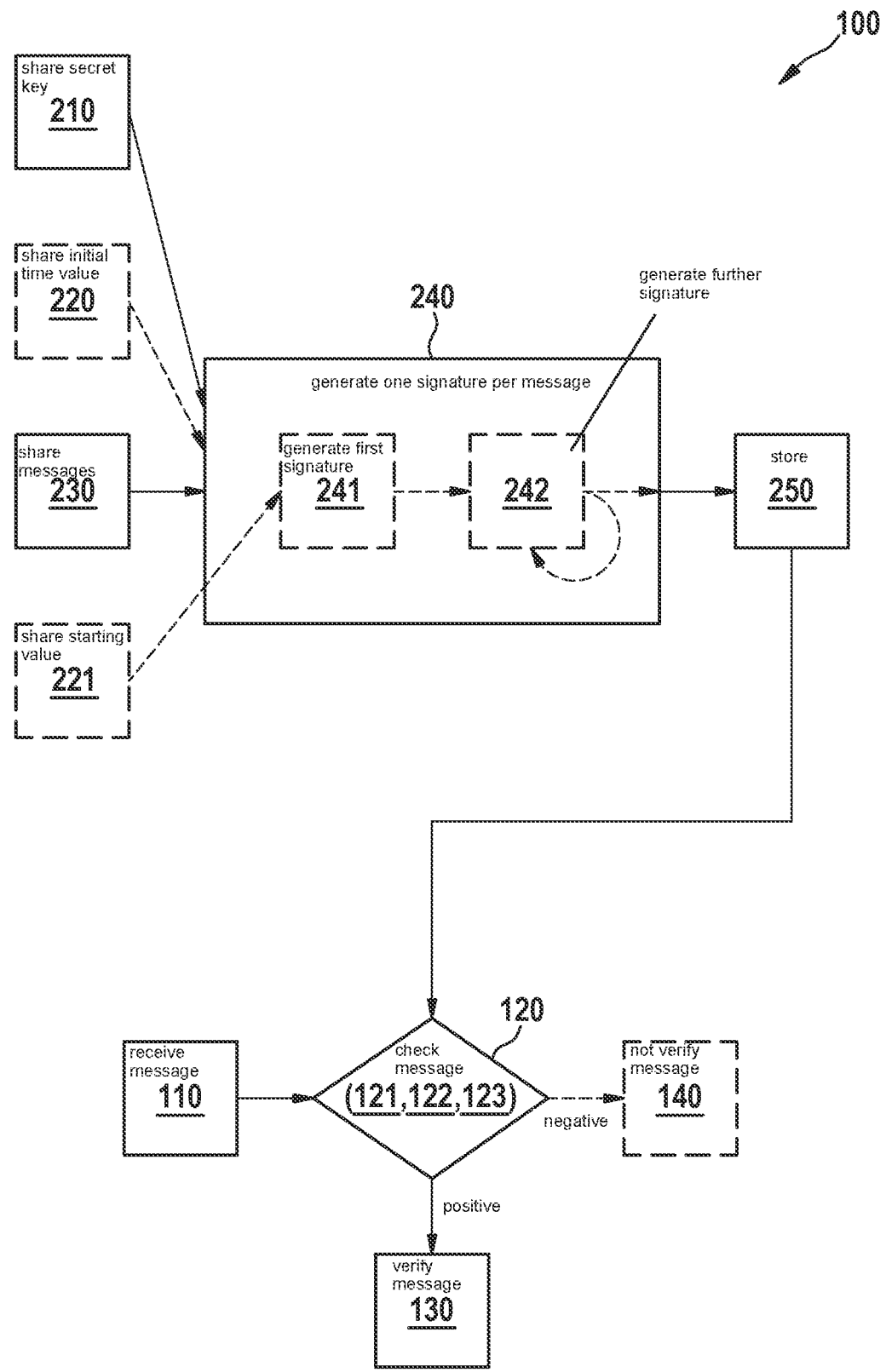
FIG. 3 schematically illustrates a specific embodiment of the computer-implemented method for verifying messages in a service-oriented communication system of a vehicle, according to an example embodiment of the present invention.
Figure 5A:
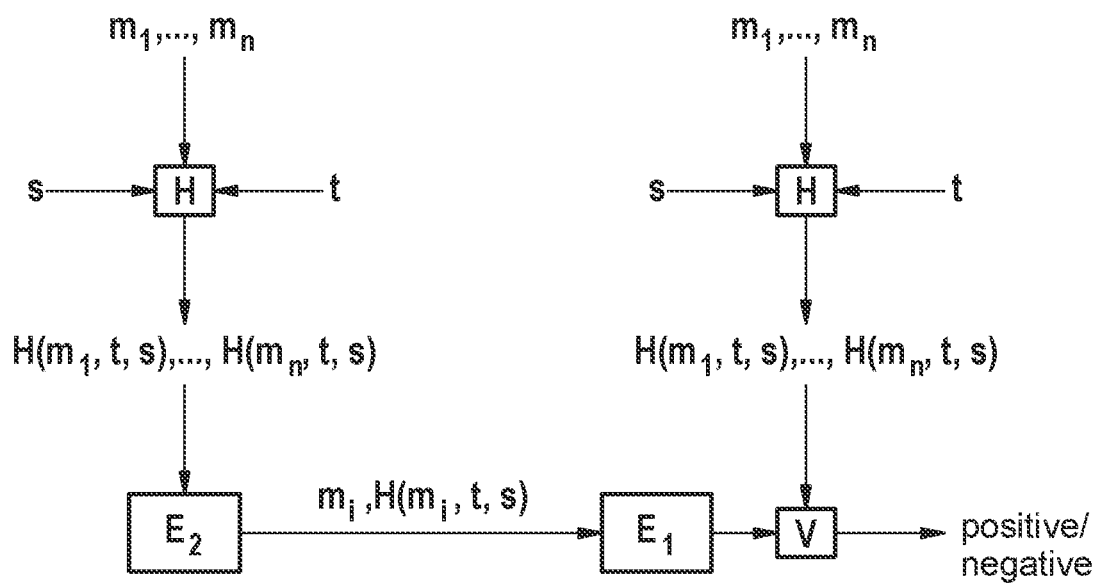
FIG. 5A shows a specific embodiment of the methods of the present invention.
Figure 5B:
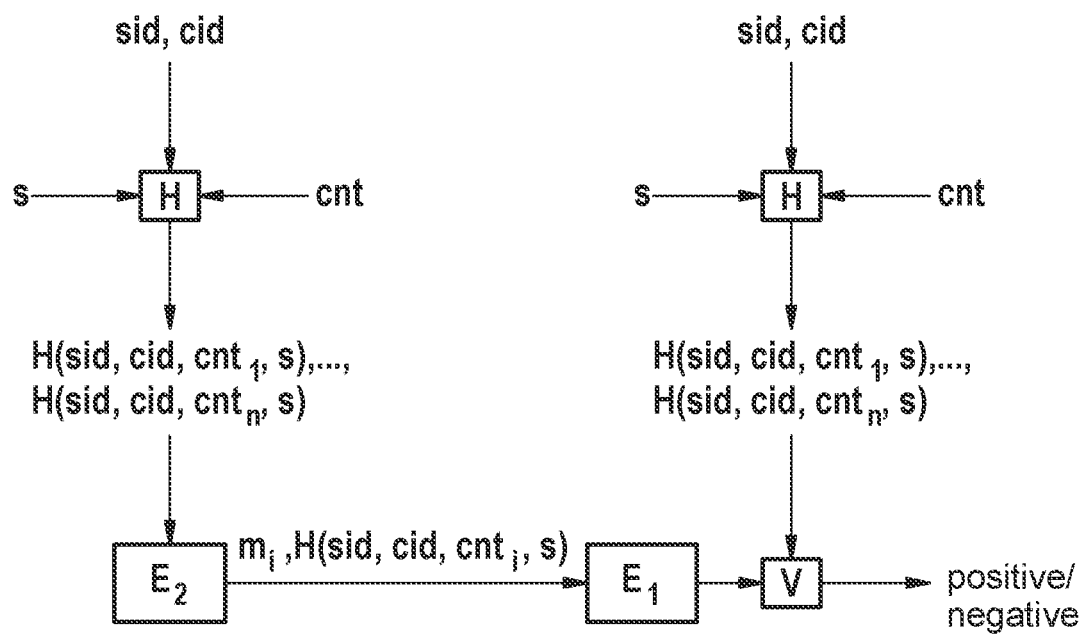
FIG. 5B shows a further specific embodiment of the methods of the present invention.

Method 100 is represented schematically in FIG. 1 (and in FIG. 3). As is shown in FIGS. 5A-5B, steps 120, 130/140 may take place, for example, in a verifying module V in first entity 310 ($E_1$).

The message and the signature may be sent by a second entity 320 of service-oriented communication system 300 to first entity 310 (e.g., via routing manager RM of service-oriented communication system 300). As an alternative, first entity 310 may be mislead to think that the message and the signature start out (that is, would start out) from second entity 320. The checking 120 as to whether the message corresponds to a dedicated message and the signature corresponds to a signature belonging to the dedicated message, may include checking if the message corresponds to a message dedicated to the communication between first entity 310 and second entity 320 and the signature corresponds to a signature associated with this dedicated message.

First entity 310 may contain (e.g., in the storage device of first entity 310) a plurality of messages dedicated to the communication between first entity 310 and second entity 320 and, optionally, signatures corresponding to each. This plurality may include, for example, a plurality of pairs; each pair being able to be made up of a dedicated message and a corresponding, dedicated signature. The plurality may include, e.g., $>=1$, $>=2$, $>=5$, $>=10$, $>=20$, $>=50$, $>=100$, $>=200$, $>=500$, $>=1\times10^3$, $>=1\times10^4$ dedicated messages and, optionally, signatures belonging to each. The checking 120 as to whether the message corresponds to a dedicated message and the signature corresponds to a signature belonging to the dedicated message, may then include checking if the message matches a dedicated message of the plurality of the messages dedicated to the communication between first entity 310 and second entity 320 and the signature matches the signature associated with this dedicated message of the plurality of dedicated messages.

The checking 120 as to whether the message corresponds to a dedicated message and the signature corresponds to a signature belonging to the dedicated message, may include fetching 121 the dedicated message and, optionally, the corresponding (dedicated) signature out of a storage device in, e.g., first entity 310. Alternatively, or in addition, the checking 120 as to whether the message corresponds to a dedicated message and the signature corresponds to a signature belonging to the dedicated message, may include fetching out 122 the plurality of messages dedicated to the communication between first entity 310 and second entity 320 and, optionally, the corresponding (dedicated) signatures. The fetching-out 122 may take place substantially simultaneously to the checking 120 and may then be limited (at least temporarily) to the fetching-out of a portion of the plurality of messages dedicated to the communication between first entity 310 and second entity 320, if, during the checking 120, a dedicated message corresponding to the received 110 message is found. The corresponding signature may then be determined or fetched out, as well, and it may be checked 120 if the associated signature corresponds to the received 110 signature. If these match, then verification 130 may take place. Otherwise, the fetching-out of further dedicated messages of the plurality of messages dedicated to the communication between first entity 310 and second entity 320, as well as the checking 120, may be continued.

The signature belonging to the dedicated message may be predetermined and already stored, e.g., in the storage device of first entity 310. If the signature is predetermined, it must only be fetched out for the checking 120. This fetching-out may be carried out considerably less computationally intensively and, consequently, more rapidly than a computation 123 of the signature. The more complex computation 123 of the signature may already be accomplished in advance, that is, at an earlier time, e.g., during (re)initialization upon starting the vehicle.

Alternatively, method 100 may include computing 123 the signature corresponding to the dedicated message. For example, as shown in FIG. 1 and FIG. 3, the checking 120 as to whether the message corresponds to a dedicated message and the signature corresponds to a signature belonging to the dedicated message, may include computing 123 the signature belonging to the dedicated message. The computing 123 may take place according to the same computation procedure (labeled H in FIGS. 5A-5B) as in the computer-implemented method 200 for generating dedicated messages and, optionally, corresponding signatures, in a first entity 310 of a service-oriented communication system 300 of a vehicle, in order to communicate verifiably with a second entity (320) of service-oriented communication system 300 prior to or during the checking 120 ("on the fly").

In the case of the plurality of messages dedicated to the communication between first entity 310 and second entity 320, each signature belonging to a dedicated message may be predetermined and, e.g., already stored in the storage device of first entity 310. Alternatively, method 100 may include computing the signature belonging to the respective, dedicated message or computing at least one signature belonging to a dedicated message (e.g., the one, which matches the received 110 message) of the plurality of messages dedicated to the communication between first entity 310 and second entity 320. In this context, the computation procedure from method 200 may be used, as well.

In addition, a computer-implemented method 200 for generating (or agreeing on) dedicated messages and, optionally, corresponding signatures, in a first entity 310 of a service-oriented communication system 300 of a vehicle, for verifiable and, in particular, authenticatable communication with a second entity 320 of service-oriented communication system 300 (at a later time), is described. Not necessarily all of the messages have to be agreed upon as dedicated messages. Instead, a selection of messages, in particular, the ones, which do not have any content changeable over time, may be agreed upon as dedicated messages. Due to this, the future communication does not have to be limited. For example, messages having content that is variable over time may be sent and received without a signature and, consequently, without verification.

Method 200 includes sharing 210 a secret key s with second entity 320. For example, key s is secret in so far as (ideally,) only first entity 310 and second entity 320 and, otherwise, no one else, know secret key s. The key may be a bit sequence or byte sequence (e.g., a character string). In method 200, step 210 may be obsolete, if the sharing 210 of the secret key already takes place outside of method 200, such as during the integration of the first and second entities into service-oriented communication system 300 (e.g., in accordance with a specification of the (vehicle) manufacturer/system integrator).

Method 200 further includes sharing 230 a plurality of messages dedicated to the communication between first entity 310 and second entity 320, with second entity 320, in a predetermined order. The plurality of messages dedicated to the communication between first entity 310 and second entity 320 may include, e.g., >=1, >=2, >=5, >=10, >=20, >=50, >=100, >=200, >=500, >=1×10³, >=1×10⁴ dedicated messages. The predetermined order may possibly be unnecessary, for example, if each of the signatures is only a function of secret key s and the respective message. The messages to be shared 230 may be predetermined in that they are already present at the time immediately prior to step 230.

Method 200 further includes generating 240 one signature per dedicated message of the plurality of messages dedicated to the communication between first entity 310 and second entity 320, and in the predetermined order, on the basis of at least secret key s, in such a manner, that the signatures for each dedicated message match in first entity 310 and second entity 320. Step 240 (that is, the same computation procedure) may also be used in second entity 320.

The computation procedure (labeled as H in FIGS. 5A-5B) for the generating 240 may provide, for example, that the signatures for the dedicated messages in the two entities 310, 320 be computed in the same deterministic manner and/or on the basis of the same inputs in the two entities 310, 320. Alternatively, the generating 240 may only take place in one entity (e.g., 310), and subsequently, the dedicated messages and the corresponding signatures may be exchanged over a cryptographically secure channel. In this case, steps 210, 230 in method 200 may be obsolete. Alternatively, step 240 may be omitted, if a generating algorithm common to first entity 310 and second entity 320 is shared/agreed upon, which step 240 executes for at least one dedicated message (or for the dedicated messages of the plurality of messages dedicated to the communication between first entity 310 and second entity 320, in the predetermined order). By the power of such a generating algorithm, for example, corresponding signatures may then be generated as required ("on the fly") in method 100, during the checking 120.

Figure 2:
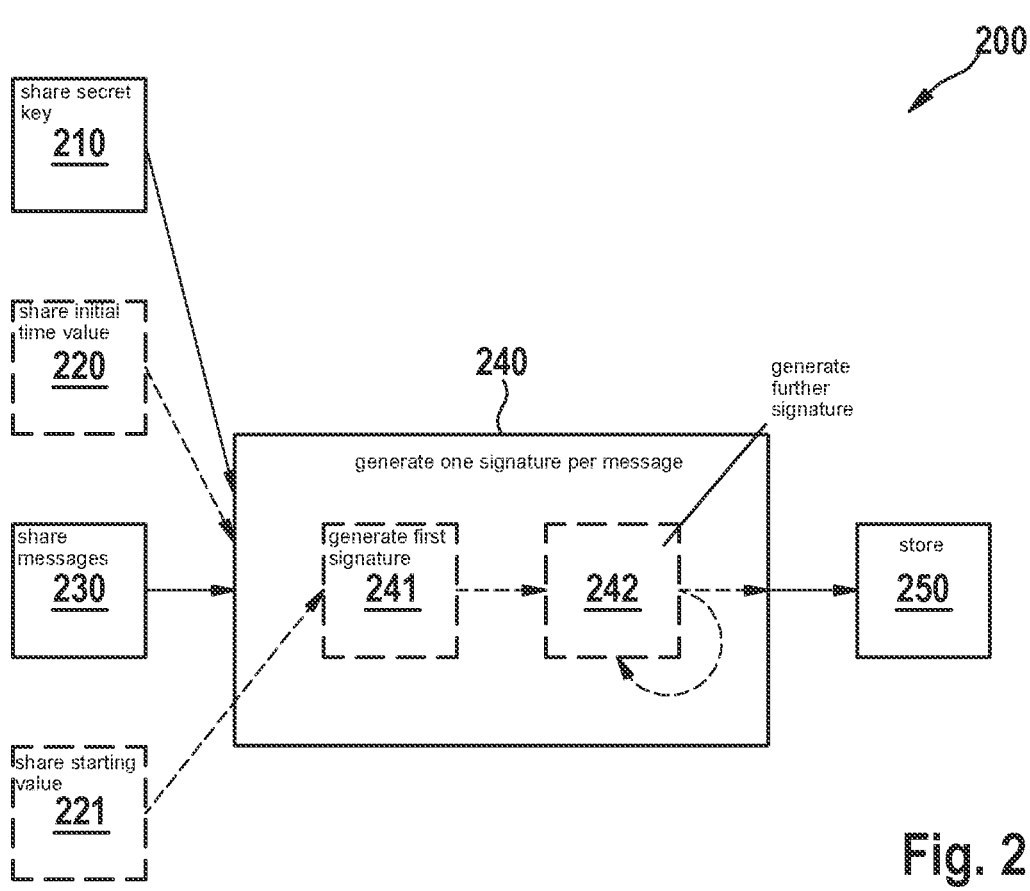
FIG. 2 schematically illustrates a computer-implemented method for generating dedicated messages and, optionally, corresponding signatures, in a first entity of a service-oriented communication system of a vehicle, in order to verifiably communicate with a second entity of the service-oriented communication system, according to an example embodiment of the present invention.

Method 200 further includes storing 250 the messages dedicated to the communication between first entity 310 and second entity 320 (e.g., in the storage device) in first entity 310. The storing of the messages dedicated to the communication between first entity 310 and second entity 320 may also take place (e.g., in a storage device) in second entity 320. Storing 250 may (advantageously) include storing of the signatures belonging to the stored messages, in first entity 310 (e.g., in the storage device). The signatures associated with the stored messages may also be stored in second entity 320 (e.g., in the storage device). However, the corresponding signatures do not have to be stored in advance. Instead, they may also be computed by the generating algorithm (shortly) before sending and/or (shortly) before verification. Method 200 is represented schematically in FIG. 2 (and in FIG. 3).

Alternatively, or in addition, method 200 may include sharing 220 an initial time value with second entity 320, from which, in the course of the generating 240, a constant or varying, but common, time value t (shown in FIG. 5A) may be ascertained in each of first entity 310 and second entity 320. The constant, common time value (in first entity 310 and second entity 320) may be, e.g., the initial time value. The initial time value may be, for example, a time stamp. Common time value t may also be a time stamp. Alternatively, the initial time value may be, for example, a counter reading. Common time value t may also be a counter reading (represented as $cnt_i$ in FIG. 5B for i=1, n). The counter reading may be discrete, for example, and increase with time (apart from an overflow, e.g., with a return to 0 in the case of a fixed bit depth). For example, first entity 310 and second entity 320 may reach agreement on a common, initial time value, as well as on logic as to how the time value develops in correlation with the time. In the case of a time stamp, the development may be given, for example, by a clock in each of first entity 310 and second entity 320 (that is, by synchronized clocks). In the case of a counter reading, the development may be given, for example, by rules as to when and how the counter reading is to be incremented. For example, the counter reading may be increased by one for each signature generated 240 for a message.

The generation 240 of the signature for each dedicated message of the plurality of messages dedicated to the communication between first entity 310 and second entity 320 may then continue to take place at least on the basis of, in each entity, the time value t that is constant or changing, but common, in the course of the generating 240. In this manner, the risk of a multiple-use/replay attack in the case of a tapped signature may be reduced considerably and/or at least for long periods of time (e.g., >1 day or >1 ignition cycle), and consequently, the security of the service-oriented communication system may be increased. The sharing 220 of the initial time value may take place, e.g., prior to or after step 210 (or also simultaneously), prior to or after step 230 (or also simultaneously), and prior to step 240.

Alternatively, or in addition, the generation 240 of the signature for each dedicated message of the plurality of messages dedicated to the communication between first entity 310 and second entity 320 may further take place at least on the basis of the respective, dedicated message. However, the generation 240 of the signature for each dedicated message of the plurality of messages dedicated to the communication between first entity 310 and second entity 320 does not have to take place (at least) on the basis of the respective, dedicated message. (In addition to the authenticity of the message) The integrity of the message is ensured by the functional relationship of the signature with the respective message.

FIG. 5A illustrates a specific embodiment of the method 200 using messages $m_1, \ldots, m_n$ dedicated to the communication between first entity 310 ($E_1$) and second entity 320 ($E_2$). For each dedicated message $m_i$ (i=1, n), a corresponding signature $H(m_i, t, s)$ may be computed in both $E_1$ and $E_2$ on the basis of common key s, constant, common time value t, and respective, dedicated message $m_i$ in accordance with the (common) computation procedure H for the generating 240. FIG. 5A further illustrates method 100; $E_1$ receiving 110 a message $m_i$ and a signature $H(m_i, t, s)$ from $E_2$. Here, the check 120 as to whether the received 110 message corresponds to a dedicated message and the received signature corresponds to a signature belonging to the dedicated message, takes place in a verifying module V in $E_1$. This provides either a positive or a negative result.

The generating 240 of the signature for each dedicated message of the plurality of messages dedicated to the communication between first entity 310 and second entity 320 may continue to take place at least on the basis of a service ID and/or a client ID (e.g., also for each dedicated message of the plurality of messages dedicated to the communication between first entity 310 and second entity 320). The service ID may uniquely indicate either first entity 310 or second entity 320. The client ID may clearly identify the entity from first entity 310 and second entity 320, which is not (already) indicated clearly by the service ID.

For example, first entity 310 may act as a server in service-oriented communication system 300, that is, may provide a service. For this service, the service ID is given by a unique identifier of first entity 310. For example, second entity 320 may subscribe to the service offered by first entity 310 as a customer (client). The client ID for this subscription is then given by a unique identifier of second entity 320. Each entity may offer a plurality of services and have, consequently, different service ID's, which each indicate this entity uniquely. Alternatively, or in addition, each entity may subscribe to a plurality of services and have, consequently, different client ID's, which each identify this entity uniquely. The server may send messages to a customer/client. Alternatively, or in addition, the client may send messages to the server.

FIG. 5B illustrates a specific embodiment of method 200; a number n of messages being shared 230 for the communication between first entity 310 ($E_1$) and second entity 320 ($E_2$). Each of the n signatures H(sid, cid, $cnt_i$, s), i=1, ..., n to be generated 240 being able to be computed on the basis of common key s, constant, common time value t, which is given, here, for example, by a counter reading $cnt_i$ (i=1, ..., n) changing in the course of the generating 240, and, for example, a service ID sid and a client id cid according to the (common) computation procedure H for the generating 240. FIG. 5B further illustrates method 100; $E_1$ receiving 110 a message $m_i$ and a corresponding signature H(sid, cid, $cnt_i$, s) from $E_2$. Here, the check 120 as to whether the received 110 message corresponds to a dedicated message and the received signature corresponds to a signature belonging to the dedicated message, takes place in a verifying module V in $E_1$. This provides either a positive or negative result. Here, the signature belonging to a message may result from the predetermined order of dedicated messages $m_1, \ldots, m_n$.

Alternatively, or in addition, method 200 may include sharing 221 a starting value r with second entity 320. Starting value r, also referred to as a(n) (initial) seed, may be a bit sequence or byte sequence (e.g., a character string). It may be, but does not have to be, secret. Step 221 may occur, e.g., after or prior to step 210 (or simultaneously), after or prior to step 220 (if present, or simultaneously), after or prior to step 230 (or simultaneously), and prior to step 240.

The generating 240 of the signature for each dedicated message of the plurality of messages dedicated to the communication between first entity 310 and second entity 320 may then include generating 241 a first signature for, according to the predefined order, a first dedicated message of the plurality of messages dedicated to the communication between first entity 310 and second entity 320, further on the basis of at least starting value r. In addition, the generating 240 of the signature for each dedicated message of the plurality of messages dedicated to the communication between first entity 310 and second entity 320 may then include (in successive repetitions) generating 242 each further signature for, according to the predefined order, a further, dedicated message of the plurality of messages dedicated to the communication between first entity 310 and second entity 320, further on the basis of, in each case, at least the signature generated 241, 242 last. By successively repeating the generating 242, a signature chain may be generated, in which, apart from the first generated 241 signature $h_1=H(s, \ldots, r)$, each signature $h_i=H(S, \ldots, h_{i-1})$ generated 242 further for i=2, n is a function of the signature generated 241, 242 immediately beforehand. In this manner, a multiple-use/replay attack in the case of a tapped signature may be ruled out (with almost complete certainty). Consequently, service-oriented communication system 300 may be protected even more effectively by the signature chain.

According to the method 200 for generating dedicated messages and, optionally, corresponding signatures in first entity 310 of service-oriented communication system 300 of the vehicle, the dedicated message and, optionally, the signature corresponding to the dedicated message in method 100 may be/have been stored 250 in first entity 310, in order to verifiably communicate with a second entity 320 of service-oriented communication system 300. The linking of methods 100, 200 is represented schematically in FIG. 3.

According to the method 200 for generating dedicated messages and, optionally, corresponding signatures in first entity 310 of service-oriented communication system 300 of the vehicle, the plurality of messages dedicated to the communication between first entity 310 and second entity 320 and, optionally, each of the corresponding, dedicated signatures in method 100, may be/have been stored 250 in first entity 310, in order to verifiably communicate with second entity 320 of service-oriented communication system 300.

An entity 310 in a service-oriented communication system 300 in a vehicle is additionally described; entity 310 (and, possibly, service-oriented communication system 300) being able to be designed to execute, as a first entity, the computer-implemented method 100 for verifying the messages in service-oriented communication system 300 of the vehicle. Alternatively, or in addition, entity 310 (and, possibly, service-oriented communication system 300) may be designed to execute, as a first entity, the computer-implemented method 200 for generating the dedicated messages and, optionally, the corresponding signatures, in first entity 310 of service-oriented communication system 300 of the vehicle, in order to verifiably communicate with a second entity 320 of service-oriented communication system 300. In addition to a message, service-oriented communication system 300 may be designed, for example, to transmit a signature (if desired) from the sender to the receiver. In SOME/IP, for example, the routing manager may be adapted for that purpose.

In addition, two entities 310, 320 in a service-oriented communication system 300 are described; one entity 310 of the two entities 310, 320 being designed to act as a first entity 310, and another entity 320 of the two entities 310, 320 being designed to act as a second entity 320.

Figure 4:
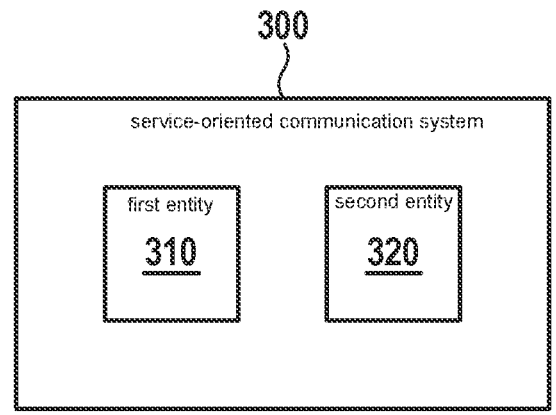
FIG. 4 schematically illustrates a service-oriented communication system in a vehicle, according to an example embodiment of the present invention.

Furthermore, a service-oriented communication system 300 in a vehicle, including an entity 310, is additionally described. Alternatively, or in addition, a service-oriented communication system 300 in a vehicle is described; the service-oriented communication system including two entities 310, 320, of which one acts as a first entity 310 and another acts as a second entity 320. Such a service-oriented communication system 300 is illustrated schematically in FIG. 4.

In addition, a computer program is described, which is configured to execute the computer-implemented method 100 for verifying messages in service-oriented communication system 300 of the vehicle. Alternatively, or in addition, the computer program (or a further computer program) may be configured to execute the computer-implemented method 200 for generating dedicated messages and, optionally, corresponding signatures, in first entity 310 of service-oriented communication system 300 of the vehicle, in order to verifiably communicate with a second entity 320 of service-oriented communication system 300. The computer program (and/or the further computer program) may be present, e.g., in an interpretable or in compiled form. It may be loaded (in parts, as well) into the RAM of a control unit or computer, for execution, e.g., as a bit sequence or byte sequence.

A computer-readable medium or signal, which stores and/or includes the computer program, is also described. The medium may include, e.g., one of RAM, ROM, EPROM, HDD, SDD, ..., in which the signal is stored.

A computer system, which is configured to execute the computer program (and/or the further computer program), is also described. The computer system may include one entity 310, 320 of the service-oriented communication system 300 or two entities 310, 320 of the service-oriented communication system 300. The computer system may include, in particular, at least a processor and at least a working memory (e.g., RAM, ...). Furthermore, the computer system may include a storage device (e.g., HDD, SDD, ...).

What is claimed is:

1. A computer-implemented method for verifying messages in a service-oriented communication system of a vehicle, comprising the following steps:
    receiving a message and a signature in a first entity of the service-oriented communication system, the message and the signature being received via the service-oriented communication system;
    checking if the message corresponds to a dedicated message and the signature corresponds to a signature belonging to the dedicated message; and
    verifying the message, based on a result of the checking being positive;
    wherein the dedicated message and the signature belonging to the dedicated message, are stored in the first entity;
    wherein the dedicated message and the signature belonging to the dedicated message are generated and stored in the first entity by:
        sharing a secret key with a second entity,
        sharing a plurality of messages dedicated to the communication between the first entity and the second entity with the second entity, in a predetermined order,
        generating a signature for each message of the plurality of messages dedicated to the communication between the first entity and the second entity, and in the predetermined order, based on at least the secret key, in such a manner that the signatures for each message match in the first entity and the second entity,
        storing the messages dedicated to the communication between the first entity and the second entity and the corresponding signatures, in the first entity, wherein the dedicated message is one of the messages dedicated to the communication between the first entity and the second entity.

2. The method as recited in claim 1, further comprising:
    not verifying the message, based on the result of the checking being negative.

3. The method as recited in claim 1, wherein the service-oriented communication system is or includes a communication middleware Scalable service-Oriented MiddlewarE over Internet Protocol ("SOME/IP").

4. A computer-implemented method for generating dedicated messages and corresponding signatures, in a first entity of a service-oriented communication system of a vehicle, in order to verifiably communicate with a second entity of the service-oriented communication system, the method comprising the following steps:
    sharing a secret key with the second entity;
    sharing a plurality of messages dedicated to the communication between the first entity and the second entity with the second entity, in a predetermined order;
    generating a signature for each dedicated message of the plurality of messages dedicated to the communication between the first entity and the second entity, and in the predetermined order, based on at least the secret key, in such a manner that the signatures for each dedicated message match in the first entity and the second entity;
    storing the messages dedicated to the communication between the first entity and the second entity and the corresponding signatures, in the first entity.

5. The method as recited in claim 4, further comprising:
    sharing an initial time value with the second entity, and wherein, in the course of the generating, a constant or varying, but common time value is ascertained from the initial time value, in each of the first entity and the second entity;
    wherein the generating of the signature for each dedicated message of the plurality of messages dedicated to the communication between the first entity and the second entity continues to take place at least on the basis of, in each instance, the time value that is constant or changing, but common, in the course of the generating.

6. The method as recited in claim 5, wherein the initial time value is a time stamp or a counter reading.

7. The method as recited in claim 4, wherein the generating of the signature for each dedicated message of the plurality of messages dedicated to the communication between the first entity and the second entity continues to take place at least based on the respective, dedicated message.

8. The method as recited in claim 4, wherein the generating of the signature for each dedicated message of the plurality of messages dedicated to the communication between the first entity and the second entity continues to take place at least based on a service identifier ("ID") and/or a client ID, and the service ID uniquely indicates either the first entity or the second entity, and the client ID uniquely indicates an entity of the first entity and the second entity which is not uniquely identified by the service ID.

9. The method as recited in claim 4, further comprising:
    sharing a starting value with the second entity, and wherein the generating of the signature for each dedicated message of the plurality of messages dedicated to the communication between the first entity and the second entity includes:
        generating a first signature for a, according to the predetermined order, first dedicated message of the plurality of messages dedicated to the communication between the first entity and the second entity, at least based on the starting value; and
        generating each additional signature for a, according to the predetermined order, further dedicated message of the plurality of messages dedicated to the communication between the first entity and the second entity, at least based on the signature last generated.

10. The method as recited in claim 4, wherein the service-oriented communication system is or includes a communication middleware Scalable service-Oriented MiddlewarE over Internet Protocol ("SOME/IP").

11. An entity in a service-oriented communication system in a vehicle, the entity comprising a computer processor and memory, and being configured, as a first entity, configured to:
    (i) verify messages in the service-oriented communication system by:
        receiving a message and a signature in the first entity of the service-oriented communication system, the message and the signature being received via the service-oriented communication system;

checking if the message corresponds to a dedicated message and the signature corresponds to a signature belonging to the dedicated message; and verifying the message, based on a result of the checking being positive; and/or (ii) generate dedicated messages and corresponding signatures, in the first entity of the service-oriented communication system in order to verifiably communicate with a second entity of the service-oriented communication system, by:

sharing a secret key with the second entity;

sharing a plurality of messages dedicated to the communication between the first entity and the second entity with the second entity, in a predetermined order;

generating a signature for each dedicated message of the plurality of messages dedicated to the communication between the first entity and the second entity, and in the predetermined order, based on at least the secret key, in such a manner that the signatures for each dedicated message match in the first entity and the second entity;

storing the messages dedicated to the communication between the first entity and the second entity and the corresponding signatures, in the first entity.

12. Two entities comprising a computer processor and memory in a service-oriented communication system, each of the two entities configured to:

(i) as a first entity, verify messages in the service-oriented communication system by:

receiving a message and a signature in the first entity of the service-oriented communication system, the message and the signature being received via the service-oriented communication system;

checking if the message corresponds to a dedicated message and the signature corresponds to a signature belonging to the dedicated message; and verifying the message, based on a result of the checking being positive; and/or (ii) as the first entity, generate dedicated messages and corresponding signatures in order to verifiably communicate with a second entity of the two entities, by:

sharing a secret key with the second entity;

sharing a plurality of messages dedicated to the communication between the first entity and the second entity with the second entity, in a predetermined order;

generating a signature for each dedicated message of the plurality of messages dedicated to the communication between the first entity and the second entity, and in the predetermined order, based on at least the secret key, in such a manner that the signatures for each dedicated message match in the first entity and the second entity;

storing the messages dedicated to the communication between the first entity and the second entity and the corresponding signatures, in the first entity.

13. A service-oriented communication system in a vehicle, comprising:

an entity comprising a computer processor and memory and configured to, as a first entity:

(i) verify messages in the service-oriented communication system by:

receiving a message and a signature in the first entity of the service-oriented communication system, the message and the signature being received via the service-oriented communication system;

checking if the message corresponds to a dedicated message and the signature corresponds to a signature belonging to the dedicated message; and verifying the message, based on a result of the checking being positive; and/or (ii) generate dedicated messages and corresponding signatures, in the first entity of the service-oriented communication system in order to verifiably communicate with a second entity of the service-oriented communication system, by:

sharing a secret key with the second entity;

sharing a plurality of messages dedicated to the communication between the first entity and the second entity with the second entity, in a predetermined order;

generating a signature for each dedicated message of the plurality of messages dedicated to the communication between the first entity and the second entity, and in the predetermined order, based on at least the secret key, in such a manner that the signatures for each dedicated message match in the first entity and the second entity;

storing the messages dedicated to the communication between the first entity and the second entity and the corresponding signatures, in the first entity.

* * * * *